US00RE50803E

(19) United States
(12) Reissued Patent
Gustafsson et al.

(10) Patent Number: US RE50,803 E
(45) Date of Reissued Patent: Feb. 17, 2026

(54) DEVICES FOR ENHANCING TRANSMISSIONS OF STIMULI IN AUDITORY PROSTHESES

(71) Applicant: Cochlear Limited, Macquarie University (AU)

(72) Inventors: Johan Gustafsson, Macquarie University (AU); Tommy Bergs, Macquarie University (AU)

(73) Assignee: Cochlear Limited, Macquarie University (AU)

(21) Appl. No.: 17/507,693

(22) Filed: Oct. 21, 2021

Related U.S. Patent Documents

Reissue of:
(64) Patent No.: 10,455,336
Issued: Oct. 22, 2019
Appl. No.: 14/052,224
Filed: Oct. 11, 2013

(51) Int. Cl.
*H04R 25/00* (2006.01)

(52) U.S. Cl.
CPC ..... *H04R 25/606* (2013.01); *H04R 25/305* (2013.01); *H04R 25/70* (2013.01); *H04R 2225/021* (2013.01)

(58) Field of Classification Search
CPC ..... H04R 25/305; H04R 25/606; H04R 2225/021; H04R 25/70
See application file for complete search history.

(56) References Cited

U.S. PATENT DOCUMENTS 4,049,930 A * 9/1977 Fletcher ..... H04R 25/30 381/60
5,912,977 A * 6/1999 Gottschalk-Schoenig ..... H04R 25/00 381/108
6,137,889 A * 10/2000 Shennib ..... H04R 25/456 181/130
6,788,790 B1 9/2004 Leysieffer
7,827,671 B2 11/2010 Hakansson
2002/0062059 A1* 5/2002 Waldmann ..... H04R 25/70 600/25
2002/0165466 A1* 11/2002 Givens ..... A61B 5/121 600/559
2003/0163021 A1* 8/2003 Miller ..... H04R 25/30 600/25

(Continued)

FOREIGN PATENT DOCUMENTS

KR 100855090 B1 8/2008

OTHER PUBLICATIONS

International Search Report & Written Opinion for PCT/IB2014/002941, mailed May 15, 2015.

(Continued)

*Primary Examiner* — Ovidio Escalante
(74) *Attorney, Agent, or Firm* — Pilloff Passino & Cosenza LLP; Martin J. Cosenza

(57) ABSTRACT

An actuator provides vibrational stimulation to a recipient of a bone conduction device. To ensure proper operation of the actuator, a known signal is delivered to a coil associated therewith. An output signal from the coil is analyzed for distortion, the presence of which indicates that the actuator is out of balance. If distortion is present, adjustments are made to the position of certain embodiments within the actuator to obtain a properly balanced device. Methods also include testing for distortion, after manufacture of the device.

19 Claims, 14 Drawing Sheets

(56) References Cited

U.S. PATENT DOCUMENTS

2004/0037428 A1* 2/2004 Keller ..... A61B 5/121 381/60
2004/0261158 A1* 12/2004 Depew ..... A42B 3/30 2/422
2005/0131272 A1* 6/2005 Waldmann ..... H04R 25/606 600/25
2006/0045298 A1 3/2006 Westerkull
2006/0155346 A1* 7/2006 Miller ..... H04R 25/606 607/57
2006/0247488 A1* 11/2006 Waldmann ..... H04R 25/30 600/25
2007/0083078 A1* 4/2007 Easter ..... H04R 25/606 600/25
2009/0245555 A1* 10/2009 Parker ..... H04R 25/70 381/326
2009/0323989 A1* 12/2009 Capper ..... H04R 25/70 381/151
2010/0041940 A1* 2/2010 Hillbratt ..... H04R 25/606 600/25
2010/0310084 A1 12/2010 Hersbach
2011/0152603 A1* 6/2011 Perkins ..... H04R 23/008 600/25
2011/0270014 A1* 11/2011 Flynn ..... H04R 25/70 607/57
2012/0083860 A1* 4/2012 Hakansson ..... H04R 25/606 607/57
2012/0237067 A1* 9/2012 Asnes ..... H04R 9/027 381/326
2012/0239392 A1 9/2012 Mauger
2012/0286765 A1* 11/2012 Heuvel ..... H04R 25/606 600/25
2012/0300953 A1 11/2012 Mauch et al.
2013/0006044 A1* 1/2013 Menzl ..... H04R 25/60 600/25
2013/0156241 A1* 6/2013 Jinton ..... H04R 25/606 381/326
2013/0195304 A1* 8/2013 Andersson ..... H04R 25/606 381/326
2013/0202140 A1 8/2013 Asnes
2013/0272532 A1* 10/2013 Mazanec ..... H04R 25/505 381/60
2014/0121449 A1* 5/2014 Kasic ..... H04R 25/606 600/25
2014/0126731 A1* 5/2014 Litvak ..... A61N 1/37252 381/60
2014/0169597 A1* 6/2014 Gartner ..... H04R 25/305 381/314
2014/0275736 A1* 9/2014 Ruppersberg ..... H04R 25/606 600/25
2014/0363036 A1* 12/2014 Hillbratt ..... H04R 25/45 381/318
2015/0104052 A1 4/2015 Gustafsson et al.

OTHER PUBLICATIONS

Rochman, "How to control feedback in a sound system | Shure Blog," Jan. 25, 2013. Retrieved from the Internet: <URL: http://blog.shure.com/how-to-control-feedback-in-a-sound-system/>, 8 pages.
European Search Report in Application No. 14851598.4, dated Apr. 21, 2017, 9 pages.

* cited by examiner

DEVICES FOR ENHANCING TRANSMISSIONS OF STIMULI IN AUDITORY PROSTHESES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*The present application is a reissue application of U.S. Pat. No. 10,455,336, issued Oct. 22, 2019, from U.S. application Ser. No. 14/052,224, filed Oct. 11, 2013, the contents of which is hereby incorporated by reference in its entirety.*

BACKGROUND

An auditory prosthesis is placed behind the ear to deliver a stimulus in the form of a vibration to the skull of a recipient. These types of auditory prosthesis are generally referred to as bone conduction devices. The auditory prosthesis receives sound via a microphone located on a behind-the-ear (BTE) device, or alternatively, on a device that is attached to the skull. The sound is processed and converted to electrical signals, which are delivered by an actuator as a vibration stimulus to the skull of the recipient. In certain audio prostheses, the actuator is an electromagnetic actuator, while other prostheses utilize a variable reluctance electromagnetic actuator. The size of the air gaps between components of a variable reluctance electromagnetic actuator significantly affects the function of the actuator. To achieve the desired size of the air gaps (i.e., to ensure proper spacing between components), manufacturing tolerances of the individual components must be considered.

SUMMARY

To ensure proper operation of an actuator of an auditory prosthesis, a known signal is delivered to a coil associated with the actuator. An output signal from the coil is analyzed for distortion, the presence of which indicates that the actuator is out of balance. If distortion is present, adjustments are made to the position of certain components within the actuator to obtain a properly balanced device. Methods described herein also include testing for distortion subsequent to manufacture of the device as well as diagnostic methods to determine actuator balance. These diagnostic methods can be performed in the field by a prosthesis recipient, and can also be performed automatically as part of a prosthesis operational test. The described methods also allow for an in-situ diagnosis of the actuator balance which can indicate actuator performance.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
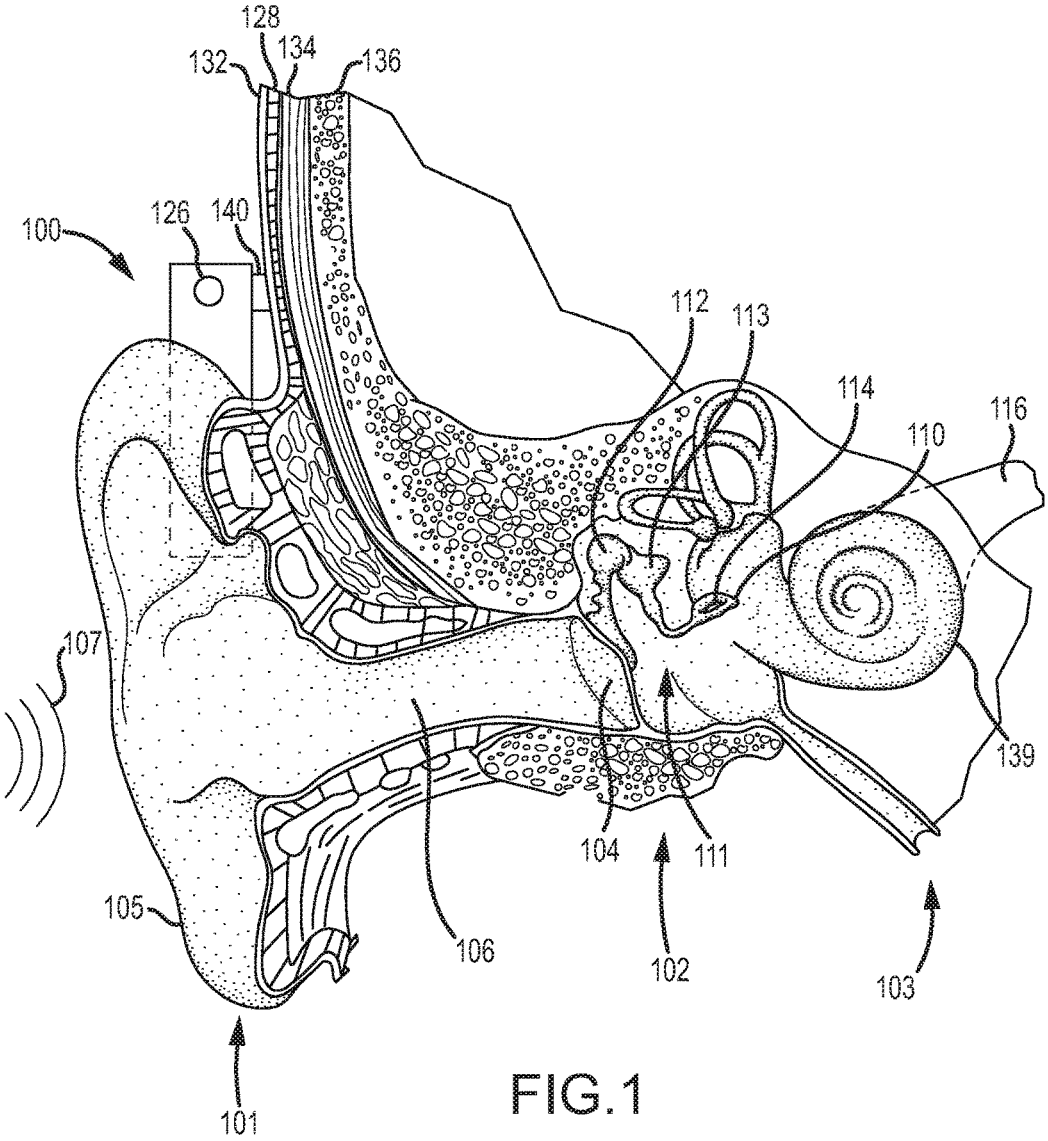
FIG. 1 is a view of a percutaneous bone conduction device worn on a recipient.
Figure 2:
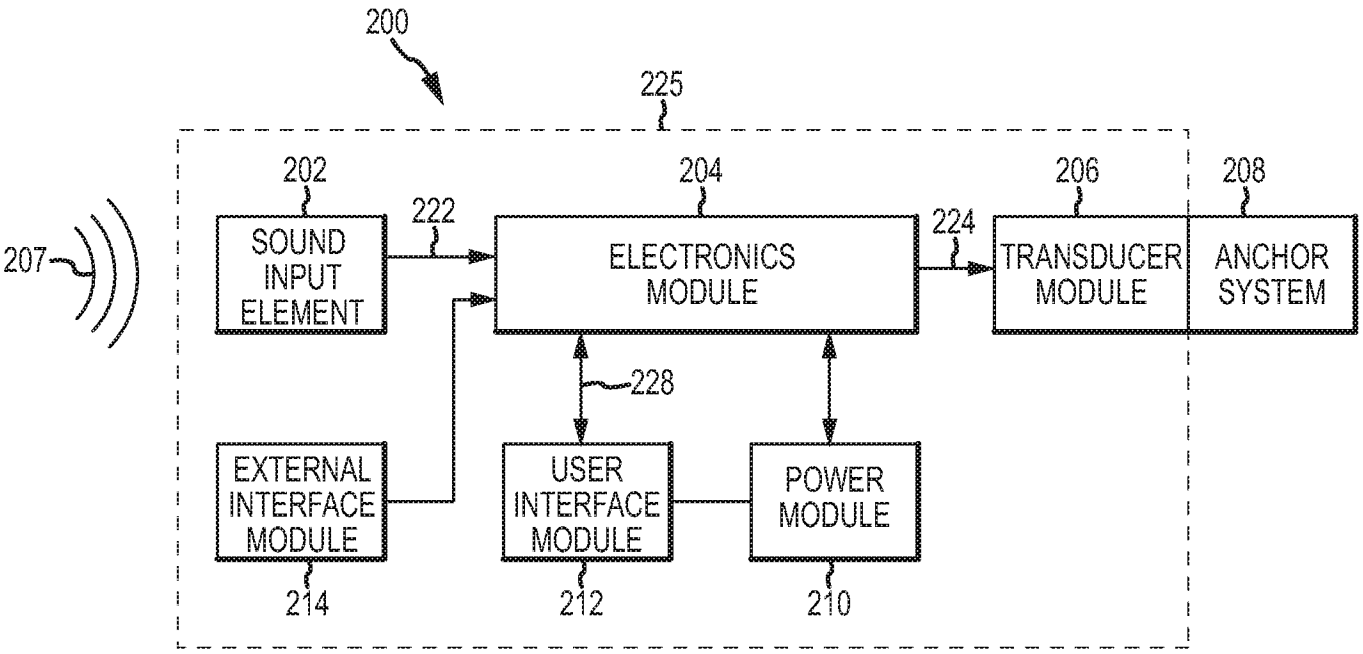
FIG. 2 is a schematic diagram of a percutaneous bone conduction device.

Although FIGS. 1 and 2 depict percutaneous bone conduction devices, where a coupling apparatus is connected to an anchor system implanted within the recipient's skull, the technologies disclosed herein may also be used in passive and active transcutaneous bone conduction devices. In a passive transcutaneous bone conduction device, the actuator is secured to the head with a magnet that interacts with an implanted device, and no anchor passes through the skin. Additionally, an actuator may be adhered to the skin with an adhesive, such that the vibrational forces pass through the skin to the bone. For clarity here, however, the technologies will be described generally in the context of percutaneous bone conduction devices. The technologies described herein can be used in context of the transcutaneous bone conduction devices, as well as potentially direct acoustic cochlear stimulator devices or fully implanted bone conduction devices.

FIG. 1 is a perspective view of a percutaneous bone conduction device 100 positioned behind outer ear 101 of the recipient and comprises a sound input element 126 to receive sound signals 107. The sound input element 126 can be a microphone, telecoil or similar. In the present example, sound input element 126 can be located, for example, on or in bone conduction device 100, or on a cable extending from bone conduction device 100. Also, bone conduction device 100 comprises a sound processor (not shown), a vibrating electromagnetic actuator and/or various other operational components.

In embodiments, sound input device 126 converts received sound signals into electrical signals. These electrical signals are processed by the sound processor. The sound processor generates control signals that cause the actuator to vibrate. In other words, the actuator converts the electrical signals into mechanical force to impart vibrations to skull bone 136 of the recipient.

Bone conduction device 100 further includes coupling apparatus 140 to attach bone conduction device 100 to the recipient. In the example of FIG. 1, coupling apparatus 140 is attached to an anchor system (not shown) implanted in the recipient. An exemplary anchor system (also referred to as a fixation system) can include a percutaneous abutment fixed to the recipient's skull bone 136. The abutment extends from skull bone 136 through muscle 134, fat 128, and skin 132 so that coupling apparatus 140 can be attached thereto. Such a percutaneous abutment provides an attachment location for coupling apparatus 140 that facilitates efficient transmission of mechanical force.

A functional block diagram of one example of a bone conduction device 200 is shown in FIG. 2. Sound 207 is received by sound input element 202. In some arrangements, sound input element 202 is a microphone configured to receive sound 207, and to convert sound 207 into electrical signal 222. Alternatively, sound 207 is received by sound input element 202 as an electrical signal.

As shown in FIG. 2, electrical signal 222 is output by sound input element 202 to electronics module 204. Electronics module 204 is configured to convert electrical signal 222 into adjusted electrical signal 224. As described below in more detail, in certain embodiments, electronics module 204 can include a sound processor, control electronics, transducer drive components, and a variety of other elements. Additionally, electronics module 204 can include the testing electronics required to perform the actuator balance testing methods described herein.

As shown in FIG. 2, actuator or transducer 206 receives adjusted electrical signal 224 and generates a mechanical output force in the form of vibrations that are delivered to the skull of the recipient via anchor system 208, which is coupled to bone conduction device 200. Delivery of this output force causes motion or vibration of the recipient's skull, thereby activating the hair cells in the recipient's cochlea (not shown) via cochlea fluid motion.

FIG. 2 also illustrates power module 210. Power module 210 provides electrical power to one or more components of bone conduction device 200. For ease of illustration, power module 210 has been shown connected only to user interface module 212 and electronics module 204. However, it should be appreciated that power module 210 can be used to supply power to any electrically powered circuits/components of bone conduction device 200.

User interface module 212, which is included in bone conduction device 200, allows the recipient to interact with bone conduction device 200. For example, user interface module 212 can allow the recipient to adjust the volume, alter the speech processing strategies, power on/off the device, initiate an actuator balance test, etc. In the example of FIG. 2, user interface module 212 communicates with electronics module 204 via signal line 228.

Bone conduction device 200 can further include an external interface module that can be used to connect electronics module 204 to an external device, such as a fitting system. Using the external interface module 214, the external device, can obtain information from the bone conduction device 200 (e.g., the current parameters, data, alarms, etc.) and/or modify the parameters of the bone conduction device 200 used in processing received sounds and/or performing other functions. In embodiments, the external interface module 214 can also be utilized to connect the bone conduction device 200 to an external device such as a home or audiologist computer, or to a smartphone via a wireless (e.g., Bluetooth) connection, so as to perform the actuator balance tests described herein.

Figure 3:
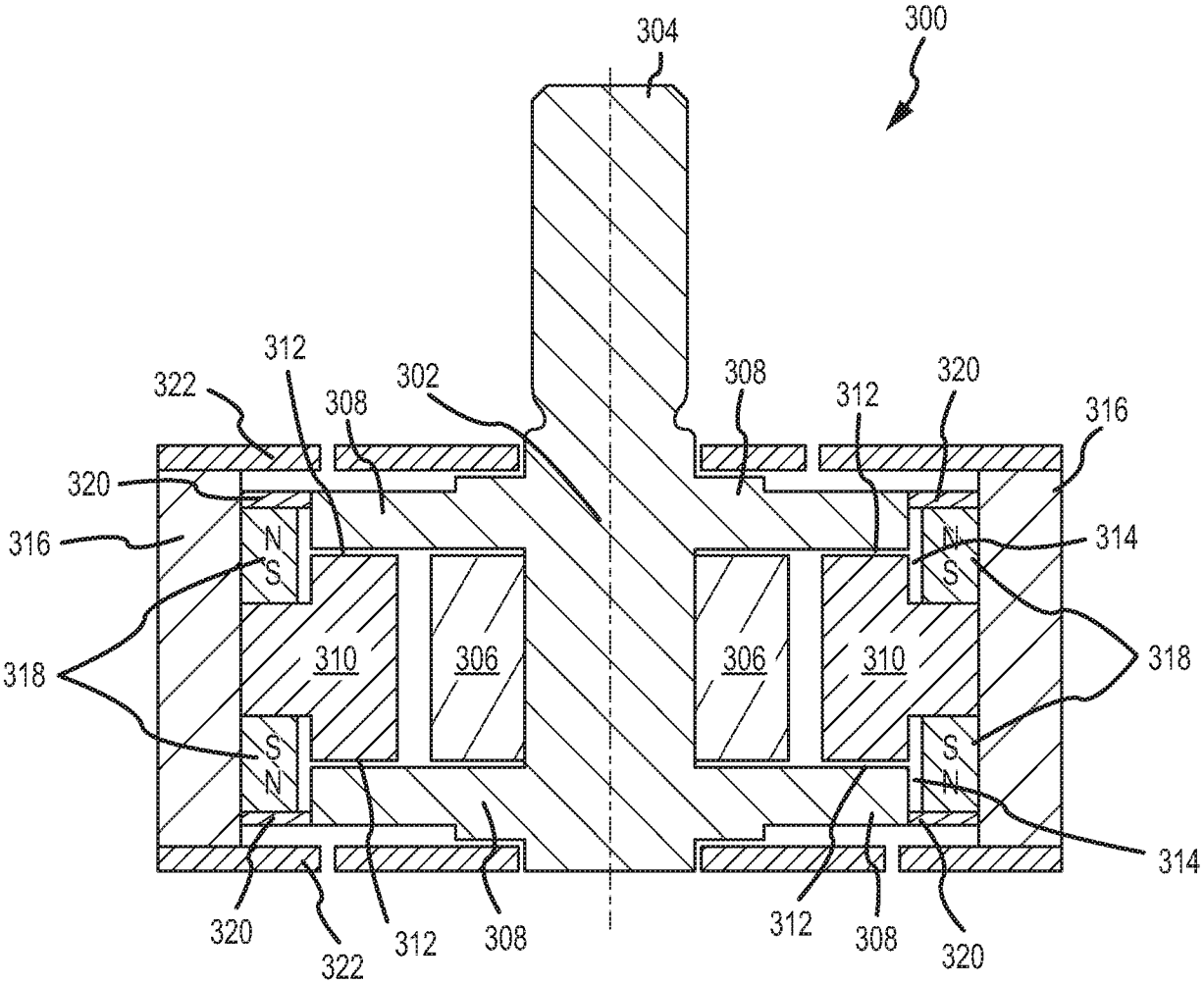
FIG. 3 is a cross-sectional view of an embodiment of actuator utilized in a bone conduction device.

Components of an actuator or transducer 300 are depicted in FIG. 3, which is a cross-sectional view of a variable reluctance electromagnetic actuator utilized in a bone conduction device. Of course, other types of actuators, such as piezoelectric or magnetostrictive actuators can be tested utilizing the methods described herein. The transducer or actuator 300 includes a bobbin 302 that includes an output shaft 304 that delivers vibrational stimulus to an implanted unit within the skull of a recipient. An electromagnetic coil 306 is wrapped around a portion of the bobbin 302, between plates 308 of the bobbin 302. A yoke 310 surrounds the coil 306 and is disposed between the two plates 308. Axial air gaps 312 are disposed between each plate 308 and the yoke 310. Radial air gaps 314 are disposed between ends of the yoke 310 and a counterweight 316. Permanent magnets 318 are disposed between the yoke 310, the counterweight 316, and magnetic rings 320. In embodiments, the bobbin 302, yoke 310, and rings 320 are manufactured from iron or other magnetic metals. Two springs 322 form the outer bounds of the actuator 300. When utilized in an auditory prosthesis, the yoke 310, permanent magnets 318, counterweight 316, and magnetic rings 320 act as a seismic mass and vibrate (vertically in FIG. 3). This vibration, in turn, is transmitted to the bobbin 302 that acts as a coupling mass and transmits the vibrations to the recipient, via the output shaft 304.

The balance point of the actuator 300 is the configuration where the mechanical spring forces produced by the springs 322 and the electromagnetic forces produced by a permanent magnets 318 balance each other. During the manufacture and balancing process, the internal parts of the actuator 300 are arranged and fixed in a configuration to obtain a balance point where the two axial air gaps 312 are equal (or close to equal) in size, as depicted in FIG. 3. A measurement (described in further detail below) is utilized to determine when the air gaps 312 between the yoke 310 and the plates 308 are of the desired width.

Figure 4:
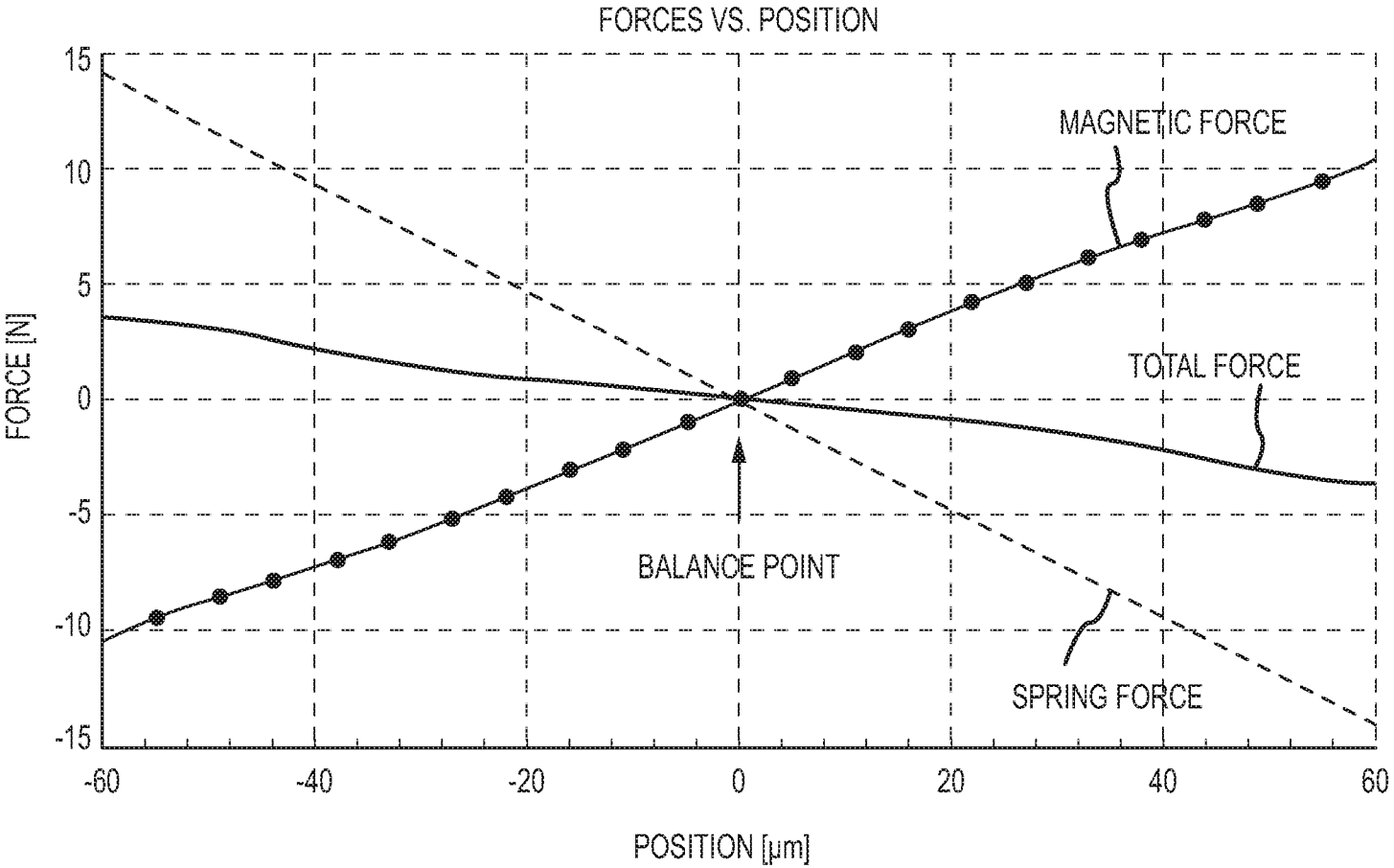
FIG. 4 is a force equilibrium point diagram.

Signal distortion acts as an indicator of how close the balance point of the actuator 300 is to the optimal balance point the actuator 300. For example, when an input signal is delivered to the coil 306, a well-balanced actuator yields a very low even harmonic distortion on an output force signal. Thus, a low distortion is one suitable indicator to use when balancing an actuator. An optimal balance point can therefore be defined as the configuration where the spring and magnetic forces balance each other, so as to produce the lowest distortion of the output force signal. The optimal balance point (e.g., the force equilibrium point) is the condition where the magnetic and spring forces are zero. This condition is depicted in the graph of FIG. 4. If distortion is present in the output signal, the position of the yoke 310, rings 320, and permanent magnets 318 (i.e., the seismic mass) can be adjusted during manufacture, prior to securing those elements to the counterweight 316. This adjustment sets the balance point at, or as close as possible to, an equilibrium, as depicted in FIG. 4. This manufacturing process, as well as testing processes to determine ongoing proper operation of an actuator, is described in more detail below. Although this disclosure uses distortion as an exemplary indicator, other signal characteristics, such as frequency, voltage, current, etc., can also be utilized as indicators.

Figure 5A:
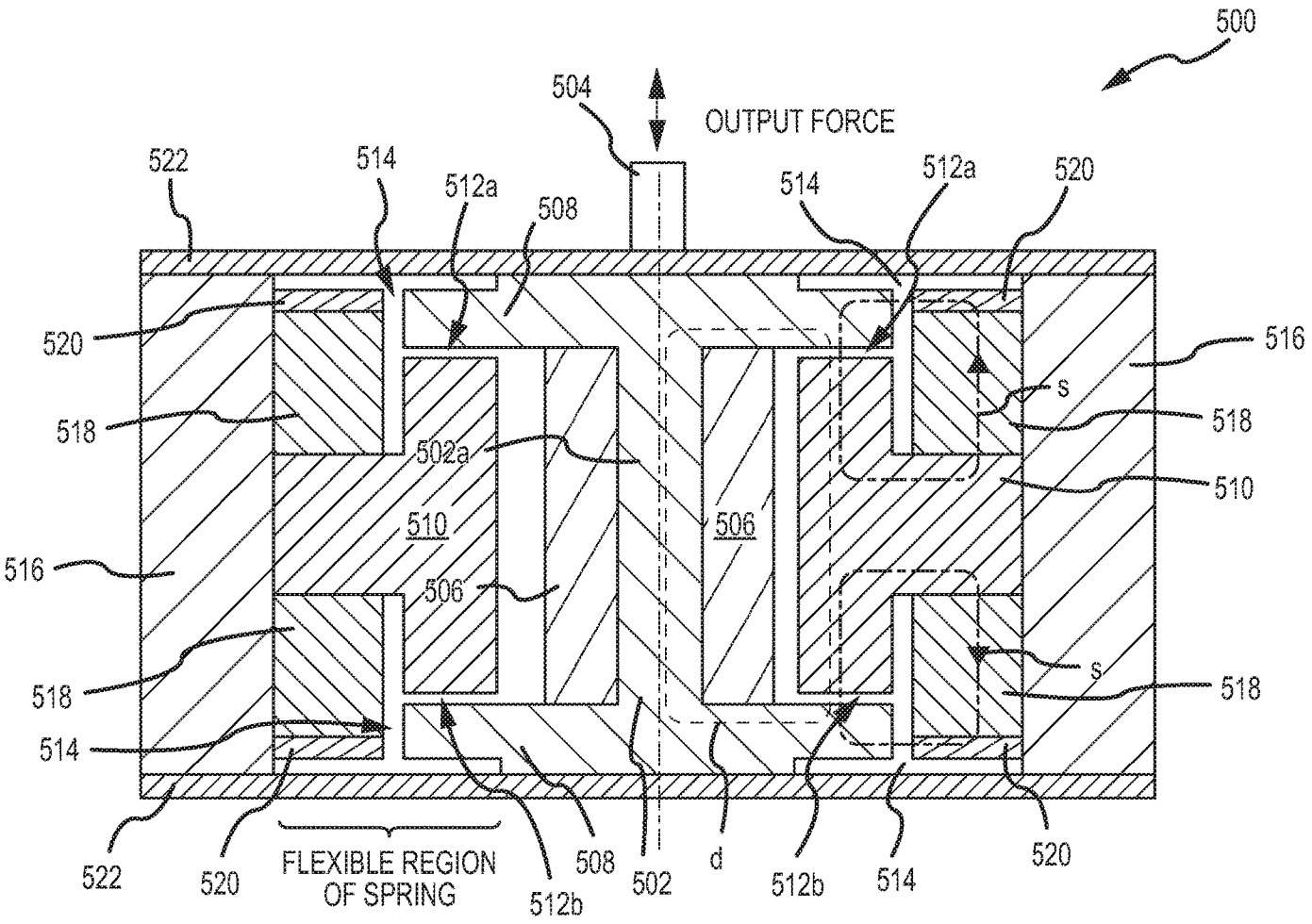
FIG. 5A is schematic cross-sectional view of an embodiment of a balanced actuator in a balanced state.
Figure 5B:
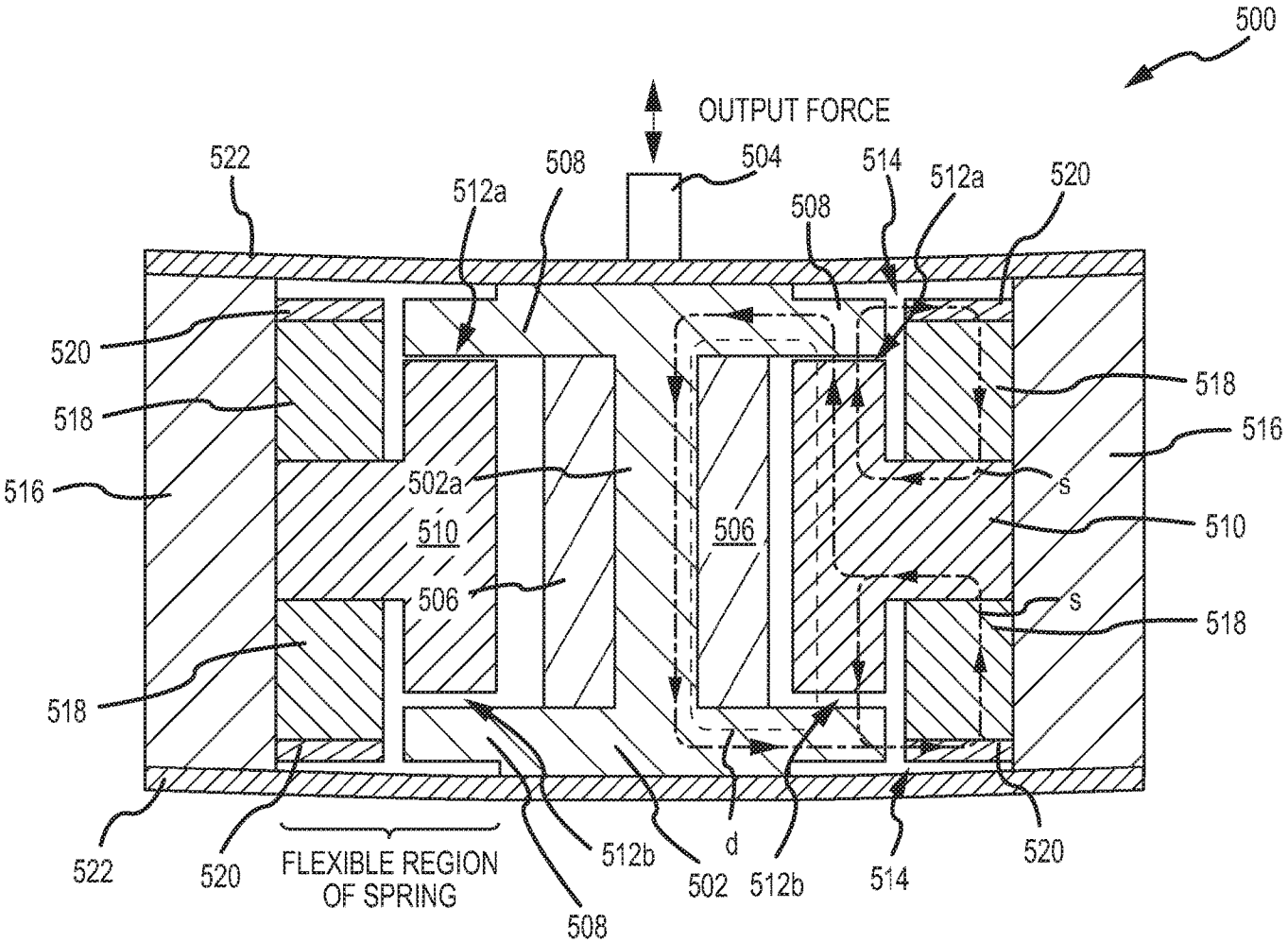
FIG. 5B is a schematic cross-sectional view of an embodiment of an balanced actuator in an unbalanced state.

FIGS. 5A and 5B depict schematic cross-sectional views of a balanced actuator in a balanced state and an unbalanced state, respectively. Components described above with regard to FIG. 3 are not described further, unless otherwise noted. As with the embodiment depicted above in FIG. 3, the actuator 500 includes a bobbin 502 including a number of plates 508. A coil 506 surrounds a core 502a of the bobbin 502, between the plates 508. Also positioned between the plates 508 is a yoke 510. Permanents magnets 518 are located on either side of the yoke 510. Notably, in FIG. 5A, the axial air gaps 512 are substantially the same (that is, the distance between the yoke 510 and plate 508 at upper axial air gap 512a and lower axial air gap 512b are substantially similar). Contrast that condition with FIG. 5B, where the upper axial air gap 512a is smaller than the lower axial air gap 512b.

To test the position of the yoke 510 relative to the plates 508 (and thus, the size of the axial air gap 512), a known input signal is delivered to the coil 506. Any distortion of the output signal can be used to indicate the position of the yoke 510 relative to the bobbin 502, because the distortion is related to the amount of static magnetic flux S through the bobbin core 502a (as described in more detail below). FIG. 5A, however, depicts a balanced state, where no such static magnetic flux S passes through the core 502a of the bobbin 502. In this condition, the magnetic forces are equal in magnitude, and both axial air gaps 512a, 512b are about equal in size (if the design of the actuator 500 is symmetric). This is the most desirable, or optimal, configuration.

If the widths of the air gap 512a, 512b are dissimilar, a static magnetic flux S will propagate through the bobbin core 502a, as depicted in FIG. 5B. Here, the actuator 500 is in an unbalanced state. This phenomenon also occurs during the normal operation of the actuator 500 as the air gaps are changing in width, due to motion of the seismic mass. If the actuator 500 has a balance point which differs from the optimal point there will be a static magnetic flux S propagating through the bobbin core 502a. If a sinusoidal voltage is applied across the actuator 500, the current flowing through the actuator coil 506 will be influenced by the static magnetic flux S.

The bobbin 302 is made out of iron or other soft magnetic material. Soft magnetic materials are generally non-linear, that is, the magnetic flux through the material is not proportional to the applied magnetic field, except for low magnetic field strengths. At high magnetic field strengths, the material is saturated by magnetic flux. If there is a certain amount of static magnetic flux S propagating through the bobbin core 502a (as depicted in FIG. 5B), there is likely to be a difference in the change of the total flux depending on whether a dynamic magnetic flux D is coinciding or opposing the static magnetic flux S. The dynamic magnetic flux D is present due to the magnetic field generated by the current flowing through the actuator coil 506. If the dynamic magnetic flux D is coinciding with the static magnetic flux S, the total flux F is likely to differ from the static magnetic flux S less than conditions where the dynamic magnetic flux D is opposing the static magnetic flux S.

Faraday's law states that a change in magnetic flux through a coil will cause a voltage (emf) to be induced in the coil. That is, $$\text{emf} = -N\frac{\Delta\phi}{\Delta t}$$

where N is the number of turns, $\phi$ is the magnetic flux and t is time. The total magnetic flux $\phi$ equals the magnetic flux density B integrated across the bobbin cross section area A. That is, $\phi=\int_A B\,dA$. The induced voltage is also called the counter-electromotive force (CEMF) as it is a voltage that pushes against the current which induces it. CEMF is the effect of Lenz's Law of electromagnetism. The induced voltage equals the voltage across the actuator ($U_{act}$=emf).

Figure 6:
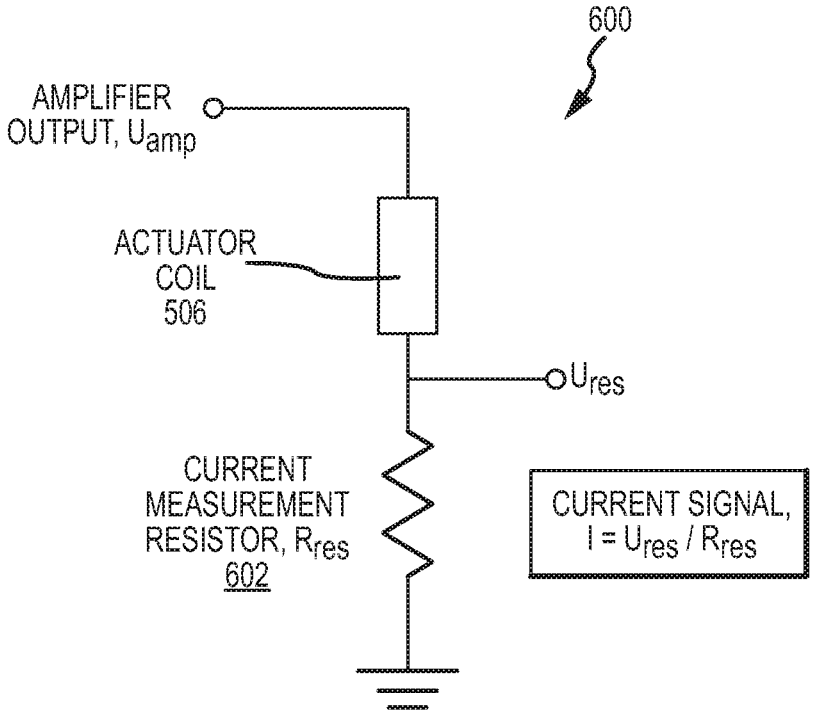
FIG. 6 depicts an embodiment of a current sensing circuit.

FIG. 6 depicts one embodiment of a current sensing circuit 600 for performing the balance tests described herein. By connecting the actuator coil 506 in series with a resistor 602 with a known resistance (e.g., 1Ω), the voltage across the resistor $U_{res}$ is, according to Ohm's law, proportional to the current I flowing through the actuator. The voltage across the resistor 602 (proportional to the current) is $$U_{res}=U_{amp}-U_{act}.$$

The change in magnetic flux $\Delta\phi$ depends on whether there is coinciding or opposing dynamic flux, as described above. Thus the amplitude of the voltage across the resistor 602 will be different depending on whether it is a positive or negative part of the waveform. The induced voltage determines the magnitude of current flowing in the circuit 600.

This circuit 600 configuration can be incorporated into the sound processor or in a separate module in the auditory prosthesis or another device, such as a computer. An output signal generator is utilized to generate an output signal and a signal acquisition device samples the $U_{res}$-voltage. By performing a harmonic analysis, e.g., using a fast Fourier transform, of the voltage signal across the resistor 602, it can be detected if there is a static magnetic flux S through the bobbin core 502a. The asymmetry of the waveform generates even harmonic distortion with odd overtones, at frequencies $$f_n=2nf$$

where f is the excitation frequency.

In the case where an actuator is balanced and there is no static magnetic flux S through the bobbin core 502a, the resistor voltage signal will only contain odd harmonic distortion with even overtones, at frequencies $$f_n=(2n+1)f$$

where f is the excitation frequency. Odd harmonic distortion is symmetric and only related to the nonlinearity or saturation of the soft magnetic material of the bobbin 502.

Figure 7A:
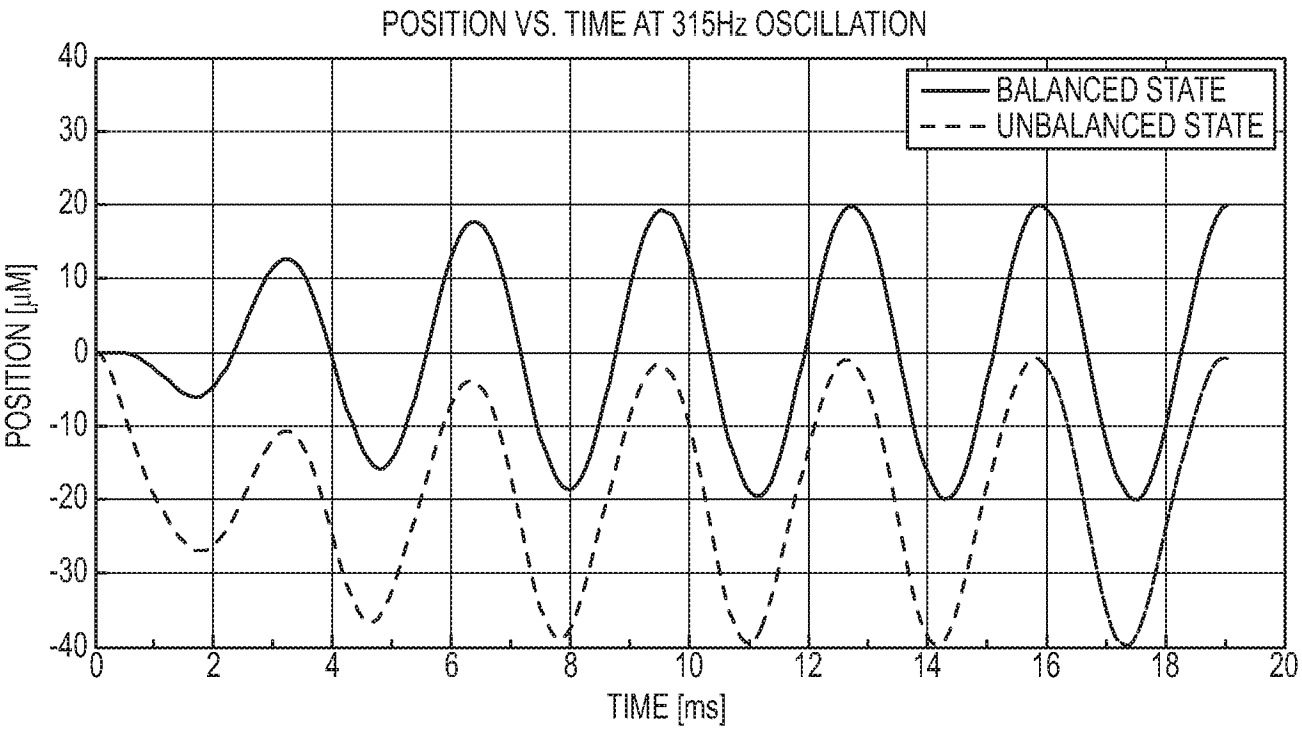
FIGS. 7A-7C depict plots of actuator oscillations.
Figure 7B:
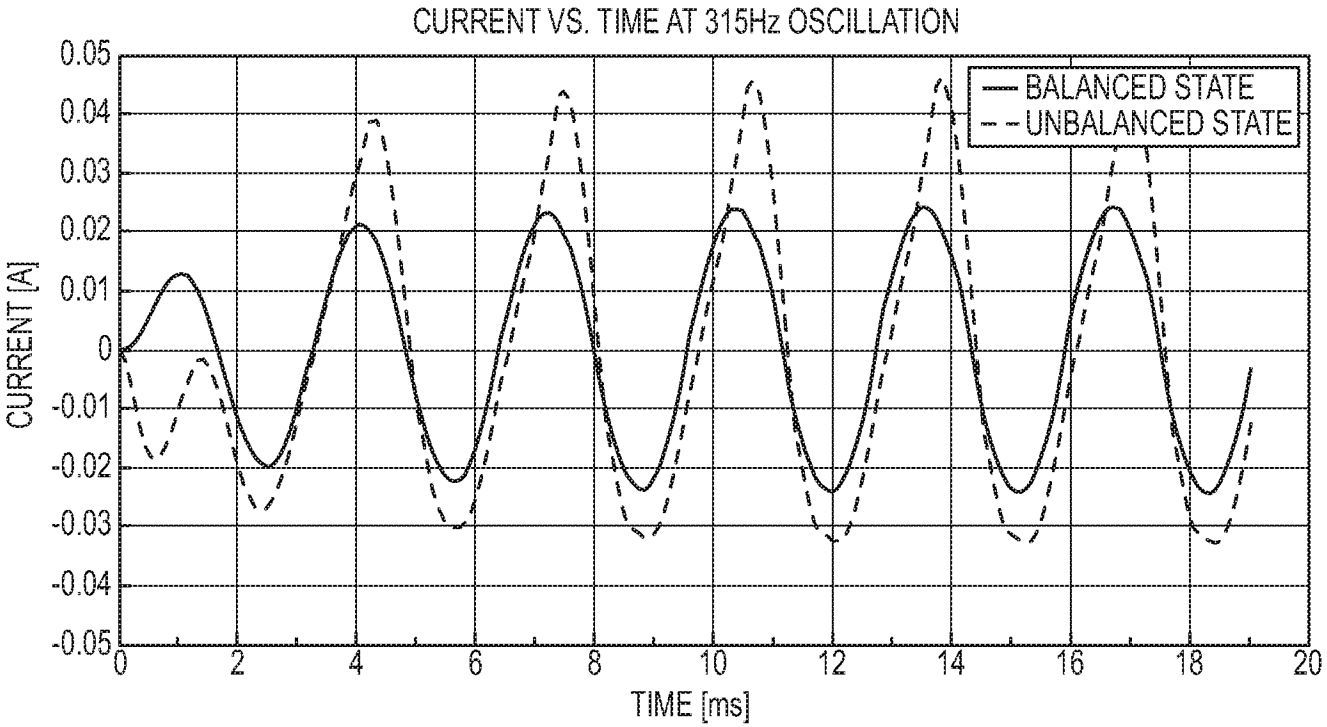
Figure 7C:
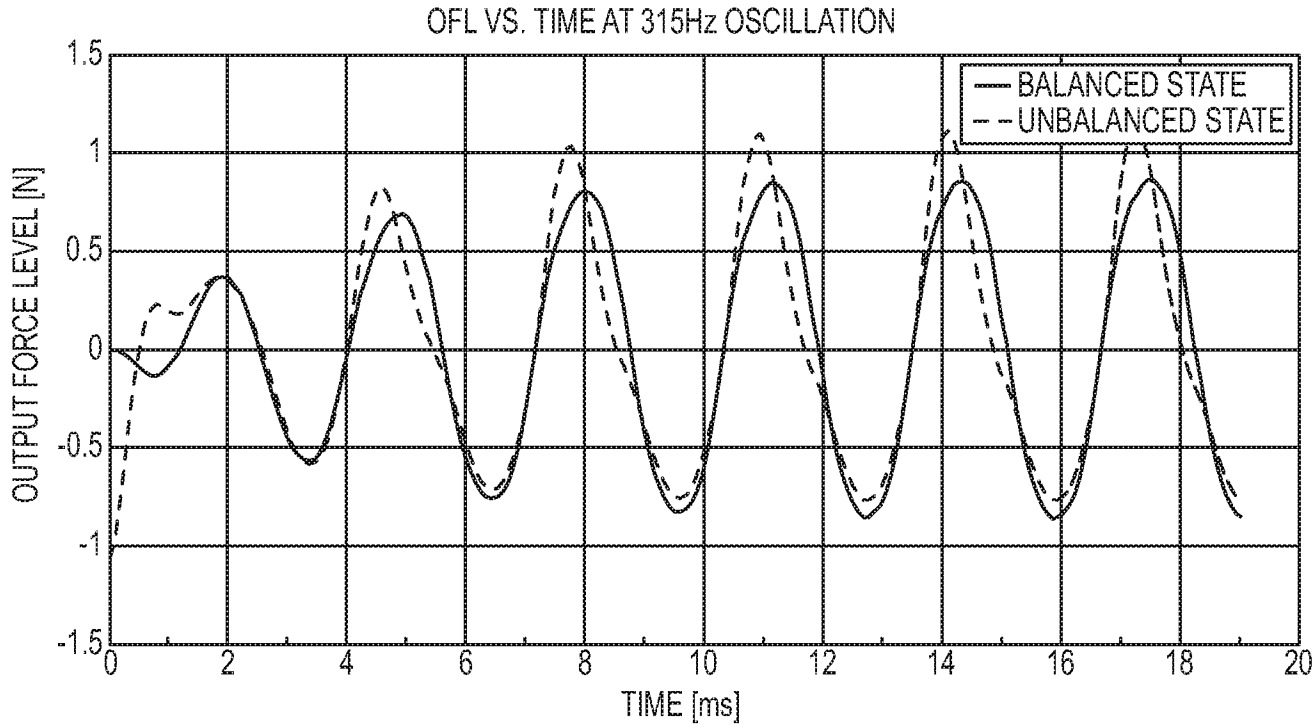

By way of example, FIGS. 7A-7C depict plots of actuator oscillation. FIG. 7A depicts position simulations, at 350 Hz, of a balanced actuator in an optimal balanced state and in a 20 μm offset unbalanced state. In this plot, a position of 0 μm is the condition when both axial air gaps are equal in size. FIG. 7B depicts current signal simulations, at 350 Hz, of a balanced actuator in an optimal balanced state and in a 20 μm offset unbalanced state. The second harmonic distortion of the current signal is about 0.04% (which is close to noise level) in the balanced state and about 20% in the unbalanced state. FIG. 7C depicts output force level simulations, at 350 Hz, of a balanced actuator in an optimal balanced state and in a 20 μm offset unbalanced state. The total harmonic distortion of the output force level is about 5% in the balanced state and about 26% in the unbalanced state.

To avoid amplification of the harmonic components (distortion) due to resonances in the testing system (which can include the actuator and the testing circuit), in one embodiment, the normalized distortion can be used in the analysis. The normalized $x^{th}$ harmonic component at frequency f is obtained by dividing the $x^{th}$ harmonic component at frequency f by the first harmonic component at frequency f·x. A sinusoidal test signal can be applied at both frequencies f and f·x. The use of normalized distortion can be useful if the harmonic component amplitude is used to predict, for example, the sensitivity of the actuator if system resonances are different. System resonances can be different, e.g., due to an unknown mechanical impedance from the skull.

Figure 8:
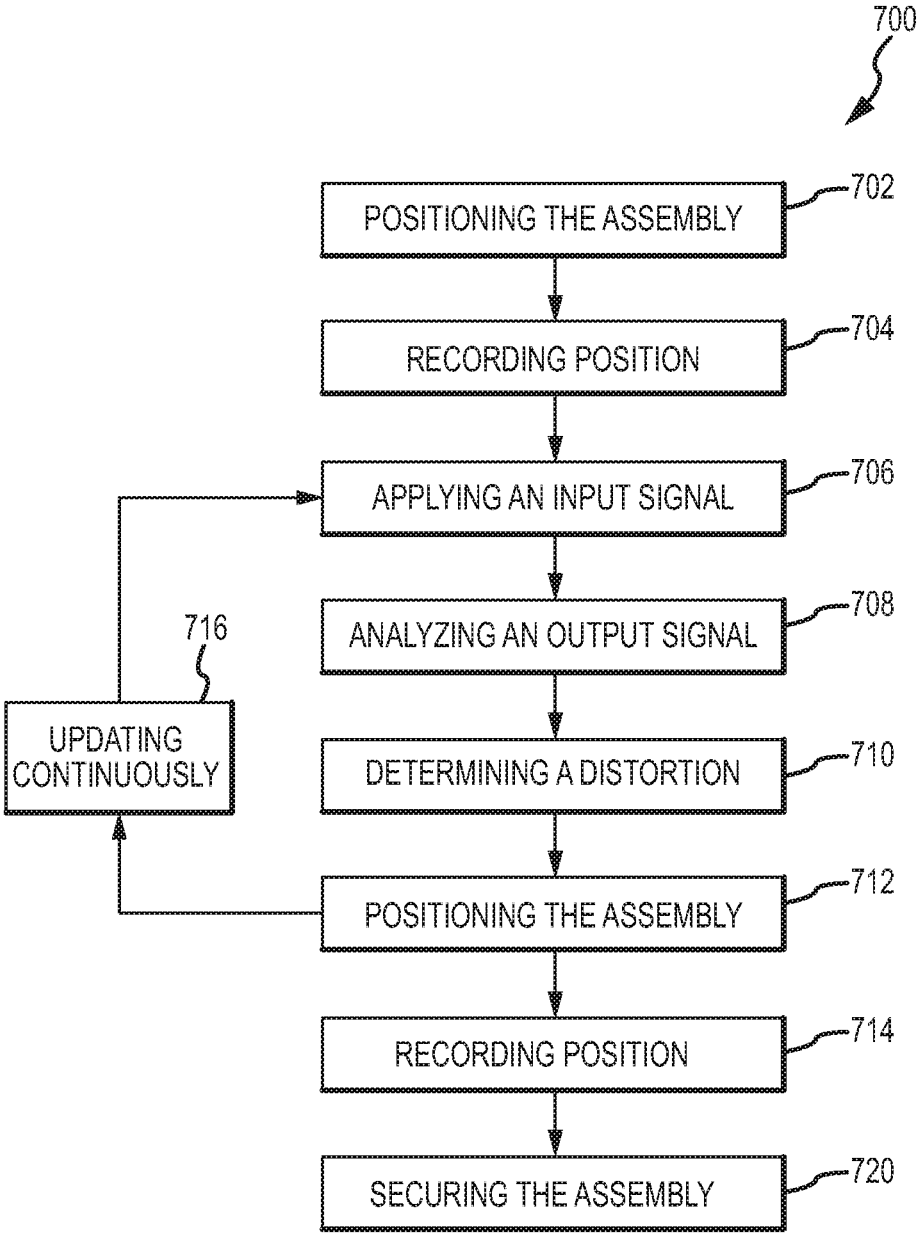
FIG. 8 depicts a method of manufacturing an actuator utilized in a bone conduction device.

FIG. 8 depicts a method 700 of manufacturing a transducer or an actuator utilized in a bone conduction device. The actuator, in this embodiment, is a variable reluctance electromagnetic actuator similar to the actuators depicted in FIGS. 3, 5A, and 5B. In other embodiments, the method 700 can be performed using other types of actuators. Initial assembly of the various components is performed, which can include fixing the springs to both the bobbin and the counterweight. After initial assembly, the method 700 begins by setting an initial position of the assembly (operation 702). More specifically, operation 702 contemplates positioning the yoke, permanents magnets, and rings relative to the counterweight. This initial position can be made by determining a position of an adjustment mechanism initially connected to the yoke. Other devices, such as high precision mechanized calipers, laser distance measuring devices, etc., can also be utilized. In embodiments, this initial position is recorded (operation 704) and stored for further use. In fact, storing additional information during manufacture is also contemplated as part of the disclosure. The various input signals, output signals, distortions, component positions, etc., can be recorded during any operation of the manufacturing process. This information allows a recipient or manufacturer of the auditory prosthesis to access a history of the device as required or desired for further troubleshooting and maintenance procedures. Flow continues to operation 706, where an input signal having known characteristics (frequency, voltage, etc.) is applied to the electromagnetic coil. An output signal from the coil is analyzed at operation 710 to identify a potential distortion. Operation 710 can include analysis of the harmonic distortion of the output signal. Distortion between the input signal and output signal is determined in operation 712. The assembly (e.g., the seismic mass or a component thereof) is repositioned relative to the counterweight in operation 714, so as to reduce the distortion.

In certain embodiments, the input signal can be a discrete, one-time signal that produces a discrete, one-time output signal. In such an embodiment, a look-up table that correlates a detected distortion to a known position can be consulted to determine the distance required to reposition the yoke so as to obtain the balance point. In other embodiments, operations 706-714 can operate continuously (as operation 716) with the system performing the signal input and distortion analysis receiving real-time feedback of the amount of distortion as the yoke is repositioned. Such a continuous or iterative process may be utilized until a stop criteria, which indicates an optimal or ideal position, is reached. The stop criteria may be a signal that indicates to the Once the assembly is repositioned as desired (in one embodiment, repositioning contemplates obtaining the ideal balance point), this final position is recorded at operation 718 for consultation or other use in the future. At any time before, during or after balance testing, other information about the actuator, such as serial number, date of assembly, location of assembly, or other information can be recorded. This information can serve as a record that can be consulted during future testing or for other purposes. In operation 720, the position of the yoke relative to the counterweight can be fixed, typically with either or both of a mechanical fastener or a chemical adhesive.

There are many factors that can influence the performance of an actuator after manufacturing, e.g., the stiffness of the actuator spring can change if the sound processor is dropped on a floor or the permanent magnets can be demagnetized by strong magnetic fields (e.g., during an MRI examination). Any of these or other factors can cause a change in the balance point, likely increase the distortion, and change the sensitivity of the actuator (that is, the force output per unit voltage). In such a case, the intended gain settings of the sound processor become inaccurate. Thus, the disclosure contemplates that the sound processor of the auditory prosthesis can be able to self-diagnose the actuator and indicate when the distortion or sensitivity is out of tolerance limits. This embodiment is particularly valuable to diagnose an actuator in-situ, in the case of implanted or head-worn stimulators. An auditory prosthesis recipient can also use the testing technologies described herein to test a unit using their home computer, without need to see an audiologist or the need to send the head-worn unit back to the manufacturer for testing, repair, or replacement.

Figure 9:
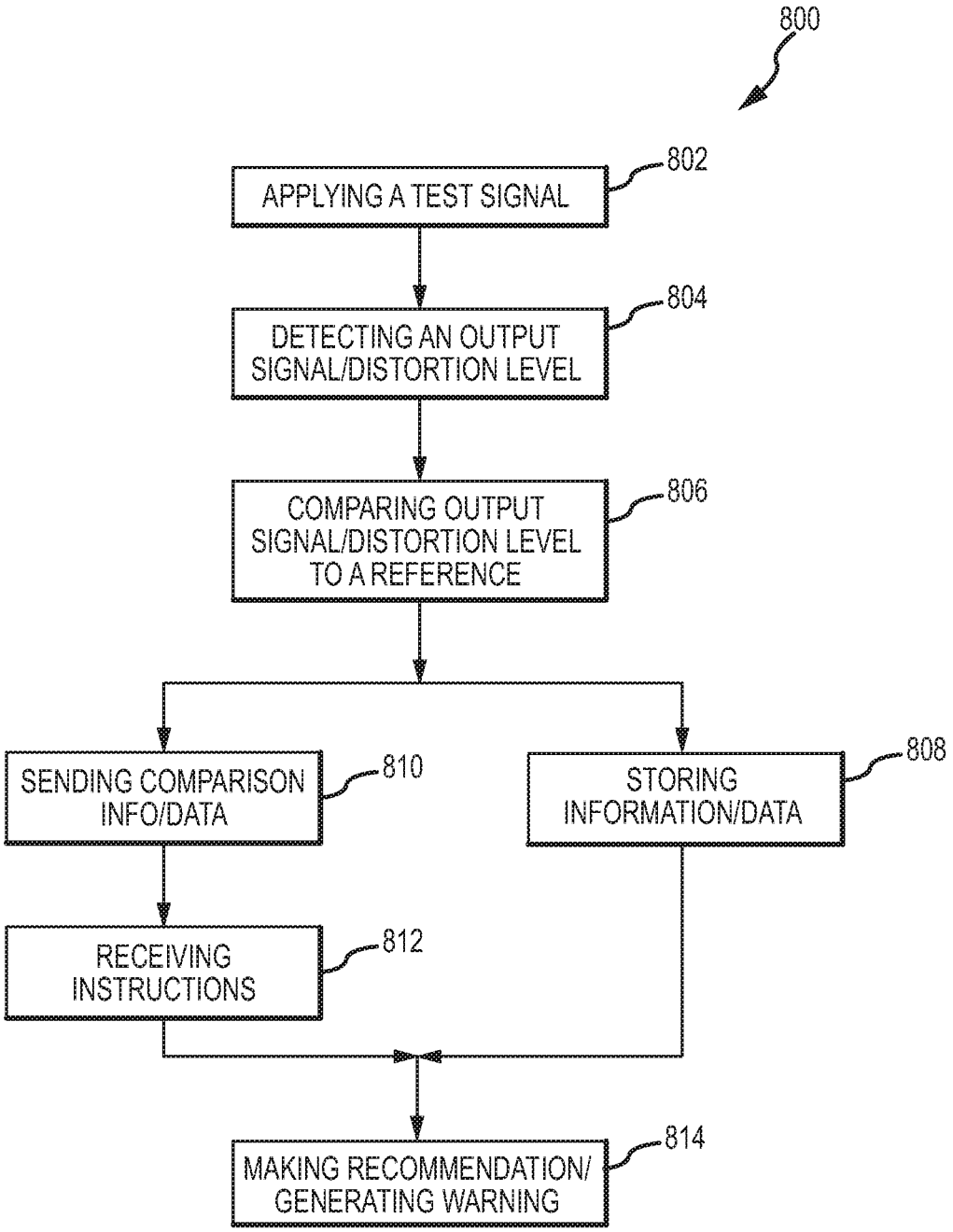
FIG. 9 depicts a method of testing an actuator utilized in a bone conduction device.

FIG. 9 depicts a method 800 of testing an actuator or transducer utilized in an auditory prosthesis. This method 800 can be performed by the sound processor of an auditory prosthesis or by a stand-alone home computer. If performed by a home computer, a recipient can first plug their auditory prosthesis into the computer via, e.g., an external interface module, or connect the auditory prosthesis to the computer using a wireless protocol (e.g., Wi-Fi, Bluetooth, etc.). The method 800 begins with the application of a test signal to the electromagnetic coil of the auditory prosthesis (operation 802). The signal can be sent by the sound processor or the attached computer. In operation 804, an output signal and/or distortion level can be detected. This output signal and/or distortion level is then compared to a reference at operation 806. The reference can be obtained from any number of sources. In one embodiment, the reference is resident on the sound processor or on the remote computer. Alternatively, the reference can be obtained via communication with a remote storage device, via a communication network. In certain embodiments, the reference is information obtained and stored during manufacture (as described above with regard to FIG. 8), that is specific to the particular device under test. In other embodiments, the reference is information consistent with performance across a product line or family. In other embodiments, the reference is information obtained from a previous test result of the actuator presently under test. In another example, the reference can be indicative of a condition of balanced harmonic distortion.

Information obtained as a result of the comparison can be stored in the sound processor or attached computer, to be used for a further tests or future diagnostics, in operation 808. In another embodiment, the comparison information and/or other data can be sent to a remote device (for example, a device located at a manufacturing facility), as depicted in operation 810. This information can be further processed at the remote device for further analytic or diagnostic purposes, stored for recordkeeping or warranty purposes, etc. Additional data, commands, or instructions determined by the remote device can be received by the computer or sound processor (depending on which device is performing the method), at operation 812. A recommendation (operation 814) can also be made based on the comparison data, distortion level, output signal, or information received from a remote device. Such a recommendation can include instructions for the recipient to perform a self-repair, return the actuator device to a facility for service, dispose of the device, etc. In other embodiments, this step can include the generation of a warning to the recipient that their device is not operating properly. Such a condition can be met if the distortion is outside of a tolerance of the reference, for example.

Figure 10:
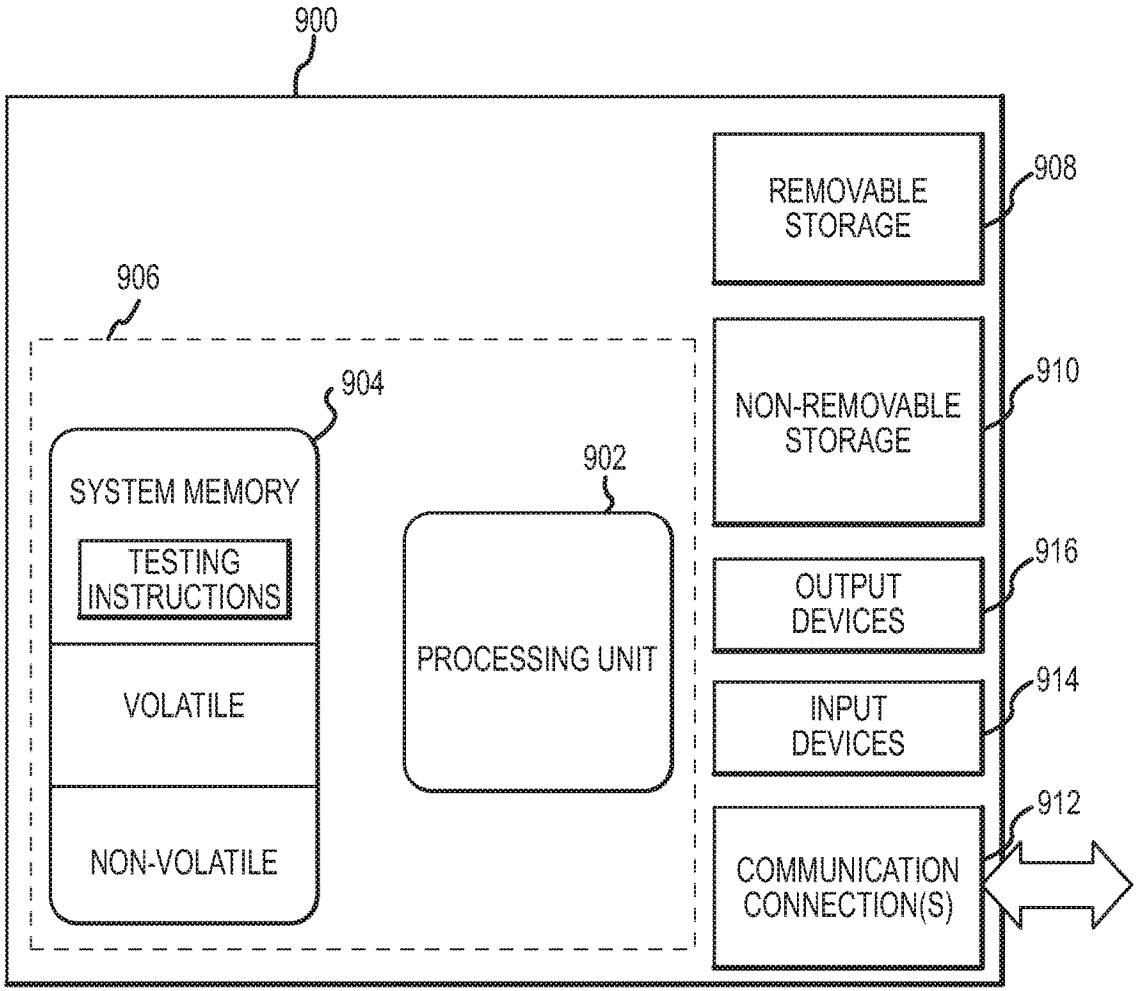
FIG. 10 depicts one example of a suitable operating environment in which one or more of the present examples can be implemented.

FIG. 10 illustrates one example of a suitable operating environment 900 in which one or more of the present embodiments can be implemented. This is only one example of a suitable operating environment and is not intended to suggest any limitation as to the scope of use or functionality. Other well-known computing systems, environments, and/or configurations that can be suitable for use include, but are not limited to, personal computers, server computers, handheld or laptop devices, multiprocessor systems, microprocessor-based systems, programmable consumer electronics such as smart phones, network PCs, minicomputers, mainframe computers, tablets, distributed computing environments that include any of the above systems or devices, and the like. Other computing systems, such as the sound processor and related modules of an auditory prosthesis, may also be utilized.

In its most basic configuration, operating environment 900 typically includes at least one processing unit 902 and memory 904. Depending on the exact configuration and type of computing device, memory 904 (storing, among other things, instructions to perform the actuator balance methods described herein) can be volatile (such as RAM), nonvolatile (such as ROM, flash memory, etc.), or some combination of the two. This most basic configuration is illustrated in FIG. 10 by line 906. Further, environment 900 can also include storage devices (removable, 908, and/or nonremovable, 910) including, but not limited to, magnetic or optical disks or tape. Similarly, environment 900 can also have input device(s) 914 such as touch screens, keyboard, mouse, pen, voice input, etc. and/or output device(s) 916 such as a display, speakers, printer, etc. Also included in the environment can be one or more communication connections, 912, such as LAN, WAN, point to point, Bluetooth, RF, etc.

Operating environment 900 typically includes at least some form of computer readable media. Computer readable media can be any available media that can be accessed by processing unit 902 or other devices comprising the operating environment. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 900 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some embodiments, the components described herein comprise such modules or instructions executable by computer system 900 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 900 is part of a network that stores data in remote storage media for use by the computer system 900.

Figure 11:
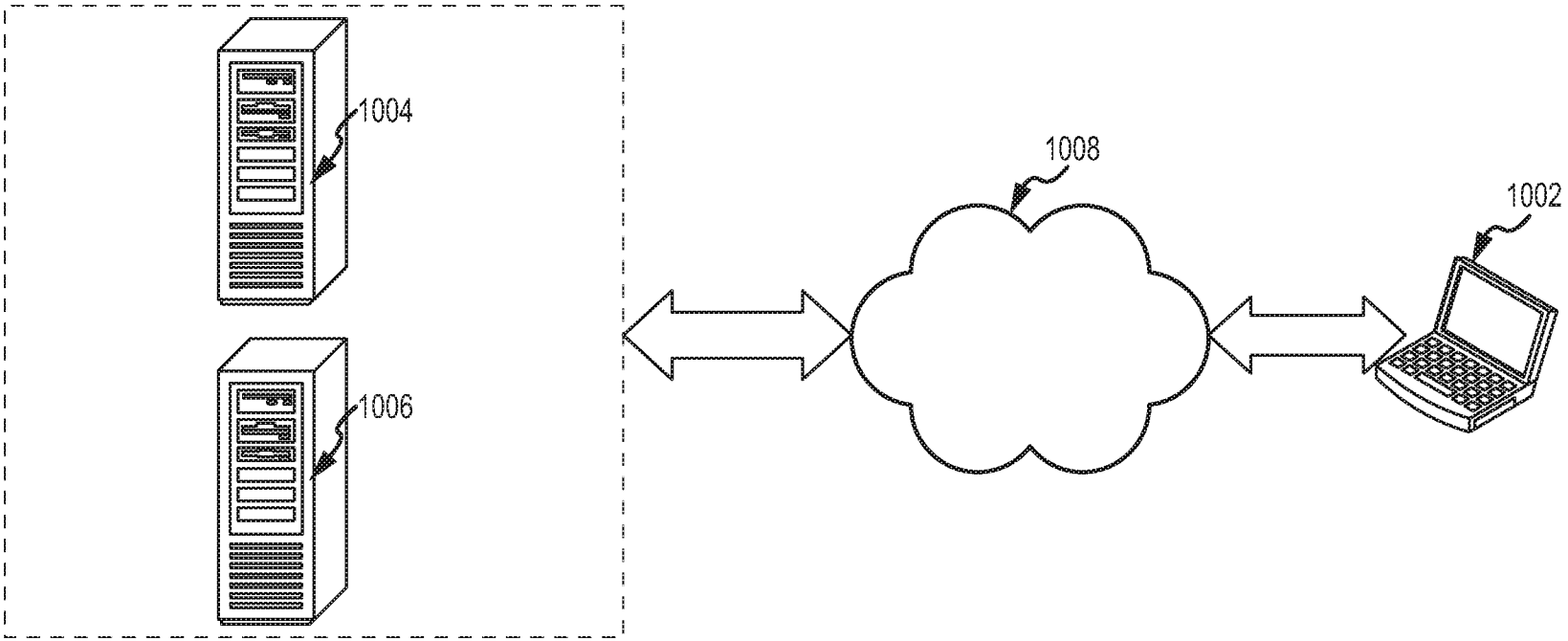
FIG. 11 is an embodiment of a network in which the various systems and methods disclosed herein can operate.

FIG. 11 is an embodiment of a network 1000 in which the various systems and methods disclosed herein can operate. In embodiments, a portable device, such as client device 1002, can communicate with one or more servers, such as servers 1004 and 1006, via a network 1008. In embodiments, a client device can be a laptop, a tablet, a personal computer, a smart phone, a PDA, a netbook, or any other type of computing device. In other embodiments, the client device can be an auditory prosthesis, and the sound processor and other components disposed therein. In embodiments, servers 1004 and 1006 can be any type of computing device. Network 1008 can be any type of network capable of facilitating communications between the client device and one or more servers 1004 and 1006. Examples of such networks include, but are not limited to, LANs, WANs, cellular networks, and/or the Internet.

In embodiments, the various systems and methods disclosed herein can be performed by one or more server devices. For example, in one embodiment, a single server, such as server 1004 can be employed to perform the systems and methods disclosed herein. Portable device 1002 can interact with server 1004 via network 1008 in sending testing results from the device being tested for analysis or storage. In further embodiments, the portable device 1002 can also perform functionality disclosed herein, such as by collecting and analyzing testing data.

In alternate embodiments, the methods and systems disclosed herein can be performed using a distributed computing network, or a cloud network. In such embodiments, the methods and systems disclosed herein can be performed by two or more servers, such as servers 1004 and 1006. Although a particular network embodiment is disclosed herein, one of skill in the art will appreciate that the systems and methods disclosed herein can be performed using other types of networks and/or network configurations.

The embodiments described herein can be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices can be employed to perform the functionality disclosed herein without departing from the scope of the disclosure.

This disclosure described some embodiments of the present technology with reference to the accompanying drawings, in which only some of the possible embodiments were shown. Other aspects, however, can be embodied in many different forms and should not be construed as limited to the embodiments set forth herein. Rather, these embodiments were provided so that this disclosure was thorough and complete and fully conveyed the scope of the possible embodiments to those skilled in the art.

Although specific embodiments were described herein, the scope of the technology is not limited to those specific embodiments. One skilled in the art will recognize other embodiments or improvements that are within the scope of the present technology. Therefore, the specific structure, acts, or media are disclosed only as illustrative embodiments. The scope of the technology is defined by the following claims and any equivalents therein.

What is claimed is:

1. A method comprising:

applying an input signal to a transducer [within a housing] *of a hearing device*, wherein the transducer comprises an adjustable assembly [within the housing] affecting operation of the transducer;

analyzing a harmonic distortion*, frequency, current and/or voltage* of an output signal generated in response to the input signal *and/or analyzing movement of the transducer resulting from the input signal*; [and]

positioning the adjustable assembly based at least in part on the analysis, thereby modifying ongoing operation of the transducer*; and*

*placing the transducer into a housing, wherein*

*positioning the adjustable assembly comprises modifying a position of a first component of the adjustable assembly relative to a position of a second component of the adjustable assembly, and*

*the first component comprises a yoke and the second component comprises a bobbin.*

[2. The method of claim 1, wherein the input signal is a sinusoidal signal.]

3. The method of claim 1, wherein the method further comprises positioning the adjustable assembly to reduce harmonic [distortion;] *distortion and* wherein distortion is minimized when the output signal is a low and even harmonic distortion[; and wherein the transducer comprises at least one of a electromagnetic actuator coil and a piezoelectric element].

4. The method of claim 1, wherein positioning the adjustable assembly [comprises] *includes* balancing a spring force applied to the adjustable assembly against a magnetic force applied to the adjustable assembly.

[5. The method of claim 1, wherein positioning the adjustable assembly comprises modifying a position of a first component of the adjustable assembly relative to a position of a second component of the adjustable assembly.]

[6. A non-transitory computer storage medium encoding computer executable instructions that, when executed by at least one processor, perform a method comprising:

applying an input signal to an electromagnetic actuator, wherein the electromagnetic actuator comprises an adjustable assembly affecting operation of the electromagnetic actuator;

analyzing a harmonic distortion of an output signal generated in response to the input signal; and repositioning the adjustable assembly based at least in part on the analysis, thereby modifying ongoing operation of the electromagnetic actuator.]

[7. The non-transitory computer storage medium of claim 6, wherein analyzing the output signal comprises performing a harmonic analysis.]

[8. The non-transitory computer storage medium of claim 7, wherein performing the harmonic analysis comprises performing a fast Fourier transform.]

[9. The non-transitory computer storage medium of claim 6, wherein the adjustable assembly is repositioned to minimize a harmonic distortion of the output signal.]

[10. The non-transitory computer storage medium of claim 6, wherein repositioning the adjustable assembly comprises balancing a spring force applied to the adjustable assembly against a magnetic force applied to the adjustable assembly.]

[11. A method comprising:

applying a test signal to an input of a transducer;

detecting a harmonic distortion level at an output of the transducer;

comparing the harmonic distortion level to a reference; and making a recommendation based at least in part on the comparison.]

[12. The method of claim 11, further comprising:

sending information regarding the comparison to a remote storage device; and receiving instructions from the remote storage device.]

[13. The method of claim 11, further comprising generating a warning based at least in part on the comparison.]

[14. The method of claim 11, further comprising storing information regarding the comparison.]

[15. The method of claim 14, wherein the stored information is used in a subsequent test.]

[16. The method of claim 11, wherein the reference is a balanced harmonic distortion.]

[17. The method of claim 13, wherein generating the warning further comprises:

determining whether the harmonic distortion level is within a tolerance of the reference; and responsive to determining that the harmonic distortion level is not within the tolerance, generating a warning.]

[18. The method of claim 17, wherein the determination is based on a calibration table.]

[19. The method of claim 11, wherein the recommendation comprises at least one of a repair command, a return command, and a dispose command.]

20. A method comprising:

determining a [harmonic distortion of an] *feature of an* output signal from a coil of an electromagnetic actuator [within a housing and] *of a bone conduction device* having an adjustable assembly; [and]

based upon the [harmonic distortion] *feature*, repositioning the adjustable assembly [within the housing] to minimize the [harmonic distortion] *feature*, thereby modifying ongoing operation of the electromagnetic actuator*, wherein the action of repositioning the adjustable assembly moves a balance point of the actuator; and*

*placing the electromagnetic actuator into a housing of the bone conduction device.*

21. The method of claim 20, further comprising applying an input signal to the coil of the electromagnetic actuator, prior to determining the [harmonic distortion] *feature*.

22. The method of claim 21, further comprising positioning the adjustable assembly relative to a counterweight prior to determining the [harmonic distortion] *feature*.

23. The method of claim 22, further comprising securing the adjustable assembly to the counterweight after repositioning the adjustable assembly.

24. The method of claim 20, wherein repositioning comprises adjusting a component of the adjustable assembly.

25. The method of claim 20, further comprising recording an initial position and an adjusted position of the adjustable assembly.

[26. The method of claim 1, further comprising:

after positioning the adjustable assembly, fixing the position of the adjustable assembly using a mechanical fastener or a chemical adhesive.]

[27. The method of claim 5, wherein the first component comprises a yoke and the second component comprises a bobbin.]

28. The method of claim 1, wherein positioning the adjustable assembly includes:

modifying a balance point of the adjustable assembly.

29. The method of claim 28, wherein the balance point is a configuration where mechanical spring forces produced by one or more springs of the transducer balance with electromagnetic forces produced by one or more permanent magnets of the transducer.

30. The method of claim 1, wherein positioning the adjustable assembly includes:

modifying a first air gap size and a second air gap size of respective air gaps defined within the transducer.

*31. The method of claim 20, wherein:*

*the coil is surrounded by other components of the electromagnetic actuator.*

*32. The method of claim 20, wherein the electromagnetic actuator includes a bobbin having a core about which the coil is wound, and the core is an inboard portion of the actuator with respect to a lateral direction of the actuator, and the bobbin extends outboard of the coil with respect to the lateral direction of the actuator.*

*33. The method of claim 20, wherein the electromagnetic actuator is configured so that at least a portion thereof is placeable in a housing of a bone conduction device, wherein the actuator is configured to be connected to the housing.*

*34. The method of claim 1, wherein the method is a method of manufacturing the transducer.*

*35. The method of claim 1, wherein placing the transducer into the housing is part of a method to make the hearing device.*

*36. The method of claim 20, wherein the action of repositioning the adjustable assembly moves a balance point of the actuator.*

*37. The method of claim 20, further comprising accessing a history of the bone conduction device for troubleshooting and/or maintenance procedures.*

* * * * *